United States Patent
Deng et al.

(10) Patent No.: US 8,510,535 B2
(45) Date of Patent: Aug. 13, 2013

(54) MIXED TORUS AND HYPERCUBE MULTI-RANK TENSOR EXPANSION METHOD

(75) Inventors: Yuefan Deng, Setauket, NY (US); Peng Zhang, Setauket, NY (US)

(73) Assignee: Shanghai Redneurons Co., Ltd, Shanghai (CN)

( * ) Notice: Subject to any disclaimer, the term of this patent is extended or adjusted under 35 U.S.C. 154(b) by 1032 days.

(21) Appl. No.: 12/141,983

(22) Filed: Jun. 19, 2008

(65) Prior Publication Data
US 2009/0024829 A1 Jan. 22, 2009

(30) Foreign Application Priority Data
Jun. 22, 2007 (CN) .......................... 2007 1 0042397

(51) Int. Cl.
*G06F 15/76* (2006.01)
(52) U.S. Cl.
USPC ............................................ 712/11; 712/12
(58) Field of Classification Search
USPC ..................................................... 712/11, 12
See application file for complete search history.

(56) References Cited

U.S. PATENT DOCUMENTS
6,230,252 B1 * 5/2001 Passint et al. .................. 712/12

OTHER PUBLICATIONS

Dandamudi et al.; "Hierarchical Interconnection Networks for Multicomputer Systems"; 1990; IEEE.*
Kumar et al.; "Extended Hypercube: A Hierarchical Interconnection Network of Hypercubes"; 1992; IEEE.*
Horiguchi et al.; "Hierarchical 3D-Torus Interconnection Network"; 2000; IEEE.*
Rahman et al.; "Modified Hierarchical 3D-Torus Network"; 2005; IEICE Transactions on Information and Systems.*

* cited by examiner

*Primary Examiner* — Andrew Caldwell
*Assistant Examiner* — Benjamin Geib
(74) *Attorney, Agent, or Firm* — Dickinson Wright PLLC

(57) ABSTRACT

The present invention provides a mixed torus and hypercube multi-rank tensor expansion method which can be applied to the communication subsystem of a parallel processing system. The said expansion method is based on the conventional torus and hypercube topologies. A mixed torus and hypercube multi-rank tensor expansion interconnection network is built up by means of supernodes equipped with expansion interfaces. This method not only provides more bisection bandwidth to the entire system but also improves the long-range communication and global operations. Affirmatively, this expansion method can achieve better scalability and flexibility for the parallel system for a given system size.

16 Claims, 4 Drawing Sheets

MIXED TORUS AND HYPERCUBE MULTI-RANK TENSOR EXPANSION METHOD

FIELD OF THE INVENTION

The present invention relates generally to the field of advanced interconnect architectures applied to multiprocessor systems and their expansion schemes. More specifically, the present invention relates to a mixed torus and hypercube tensor expansion method and a parallel processing system which are architectured by the said multi-rank expansion method.

BACKGROUND OF THE INVENTION

This present invention derives from the Chinese patent application No. 200610030472.7, titled "A self-consistent multi-rank tensor expansion scheme and multi-MPU parallel computing systems", and is an expanded implementation and optimization of the self-consistent multi-rank tensor expansion scheme to the torus and hypercube topologies.

A mixed torus expansion scheme is an easy-to-implement topology based on torus topologies and it may include multiple interconnection networks. As demonstrated in FIG. 1, it shows a conventional torus topology. As to a cluster system, a fat-tree or hypertree topology is always applied to interconnect the server nodes within which the communication system is implemented by an external federated switch, such as Infiniband, InfiniPath, Myrinet, Quadrics or Gigabit Ethernet. However, this usually requires many external switches for a cluster that complicates the system and increases the construction expenses and decreases the system expandable ability. Therefore, the implementation of the expansion interface and the design of the interconnection topology are the focus of this patent.

SUMMARY OF THE INVENTION

The present invention aims at providing a mixed torus and hypercube self-consistent multi-rank tensor expansion method and a parallel processing system architectured by the said multi-rank expansion method. As the communication system is expanded, the said multi-rank expansion method reduces the system's long-range communication latency and increase the bandwidth. The efficiency of the communication system is improved and the scalability of the whole interconnection network is guaranteed while the consistency of the topology is preserved.

For the purpose of illustrating the implementation of the present invention, we provide two types of interconnection topologies with the mixed torus and hypercube self-consistent multi-rank tensor expansion method. The two types of topologies are:

(1) A mixed interconnection system comprised of both internal and external networks.

(2) A mixed interconnection system comprised of both trunk and expansion networks.

A mixed interconnection system comprised of both internal and external networks is to interconnect a plurality of supernodes using the external interfaces based on a mixed torus topology. The said mixed system comprises: a supernode that is a unit comprising of a plurality of processing nodes interconnected as a multi-dimensional topology and the supernode's internal communication subsystem to make up of its internal processing nodes facilitating the internal communication within a supernode. Additionally, one or more Axon nodes are added to the supernode by connecting to the whole or a subset of the internal processing nodes. Herein, an Axon node is partially responsible for the external interfaces between the internal processing nodes and the external networks. All of the said external interfaces can be interconnected as a multi-dimensional torus topology to form an external communication network, which facilitate the communication of the internal processing nodes of the supernodes.

A mixed interconnection system comprised of both trunk and expansion networks is to interconnect a plurality of supernodes using both the trunk and expansion networks based on a mixed torus topology. The said mixed system comprises: all of internal processing nodes in the whole system are interconnected as a multi-dimensional torus topology to form a trunk interconnection network. One or more Axon nodes are integrated to each of supernodes to connect its internal processing nodes for providing the external interfaces, and then all of the said Axon nodes are interconnected in a multi-dimensional torus topology to form an expansion network. Both said trunk network and the said expansion network constitute the whole communication subsystem for the whole system. The network diameter of the expanded network is in general much smaller than that of the trunk network.

The said mixed torus and hypercube self-consistent multi-rank tensor expansion methods can be applied to the design of the interconnection network of a parallel processing system. The said method derives from the conventional torus and hypercube topologies. With supernodes equipped with external expansion interfaces, the mixed interconnection system can be constructed while preserving the consistency of the whole interconnection topology. The said interconnection system provides the parallel processing system with more bandwidth and higher efficiency for long-range communication resulting in better system scalability and more applications in a larger-scale parallel processing system.

BRIEF DESCRIPTION OF THE DRAWINGS

For better understanding of the design concept and characterization of the present invention, a detailed description is illustrated and wherein.

DETAILED DESCRIPTION OF THE PREFERRED EMBODIMENT

Figure 1:
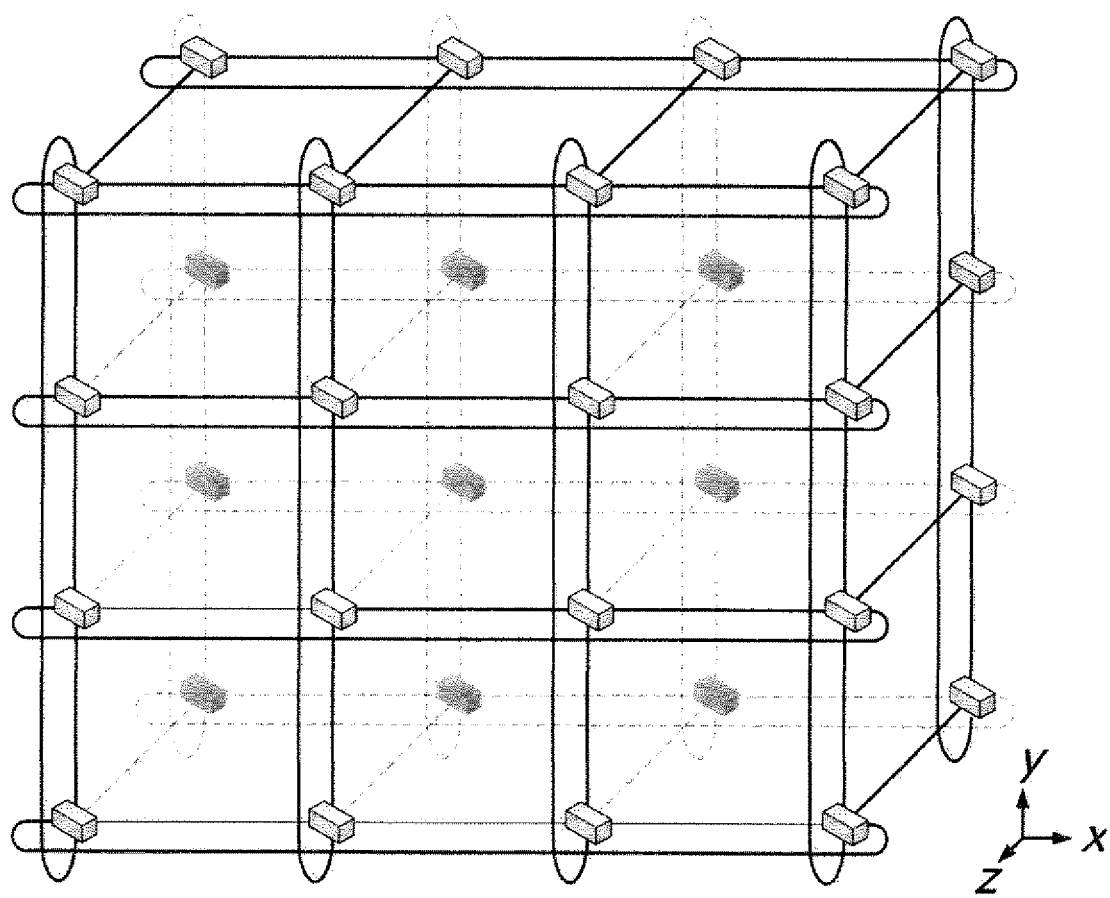
FIG. 1 is a simple illustration of a conventional three-dimensional torus topology, i.e., an exemplary embodiment of T(4×4×2).

In the present invention, we present two mixed torus and hypercube multi-rank expansion methods:

1. A mixed interconnection network comprised of both internal and external networks.

2. A mixed interconnection network comprised of both trunk and expansion networks.

The expansion network comprised of both internal and external networks is defined as follows:

Definition 1

Suppose that the internal network of a supernode S adopts a K-dimensional $T(N_1 \times N_2 \times \ldots \times N_K)$ torus topology, a supernode S integrates $$\prod_{s=1}^{K} N_s$$

internal processing nodes. An Axon node A is added to the supernode S. The said Axon node A connects to a subgroup or the whole of the internal processing nodes in the same supernode S to provide an external interface for communications among supernodes. All of the said Axon nodes in the whole system are interconnected as an L-dimensional $T(M_1 \times M_2 \times \ldots \times M_L)$ torus topology to form an external expansion network so that the whole system integrates $$\prod_{S=1}^{L} M_S$$

supernodes. The mathematical expression for the whole system is denoted as:

$$T(N_1 \times N_2 \times \ldots \times N_K) \otimes T(M_1 \times M_2 \times \ldots \times M_L)$$

Therefore, the whole interconnection network defined as such expansion method integrates $$\left(\prod_{s=1}^{K} N_s\right)\left(\prod_{S=1}^{L} M_S\right)$$

internal processing nodes. Embodiment 1 presents an exemplary embodiment for the expansion method as defined in Definition 1.

Definition 1-1

In Definition 1, particularly, the internal network in a supernode S can also be a K-dimensional hypercube topology denoted as $H(2^K)$ and with $2^K$ integrated internal processing nodes. Therefore, the mathematical expression of the whole system is denoted as:

$$H(2^K) \otimes T(M_1 \times M_2 \times \ldots \times M_L)$$

Furthermore, a mixed network comprised of both the trunk and expansion networks is an extension to the embedding interconnection scheme of utilizing multiple multi-dimensional torus topologies.

Definition 2

All of the internal processing nodes in the whole system are interconnected as a K-dimensional $T(N_1 \times N_2 \times \ldots \times N_K)$ torus topology to form a trunk network and thus the whole system integrates $$P = \prod_{s=1}^{K} N_s$$

internal processing nodes in total. One or more Axon nodes are added to a supernode while connecting to a subgroup or the whole of internal processing nodes in the said supernode. All of the said Axon nodes are interconnected as a K-dimensional $T(M_1 \times M_2 \times \ldots \times M_K)$ torus topology to form an expansion network for communication accelerations such as long-range communications and global operations. Herein, each Axon node connects to P/A internal processing nodes. The mathematical expression for the whole system is denoted as:

$$T(N_1 \times N_2 \times \ldots \times N_K) \otimes T(M_1 \times M_2 \times \ldots \times M_K)$$

To preserve the consistency of the whole topology, we always hold the assumptions that $M_S$ can be divided by $N_S$.

Definition 2-1

In Definition 2, all of said Axon nodes can also be interconnected as a L-dimensional $T(M_1 \times M_2 \times \ldots \times M_L)$ torus topology to form an expansion network and wherein L<K so that the whole system integrates $$A = \prod_{s=1}^{L} M_s$$

Axon nodes. Herein, each Axon node connects to P/A internal processing nodes. The mathematical express for the whole system is denoted as:

$$T(N_1 \times N_2 \times \ldots \times N_K) \otimes T(M_1 \times M_2 \times \ldots \times M_L)$$

To preserve the consistence of the whole system, we always hold the assumptions that A can be divided by P so each Axon node connects to P/A internal processing nodes. Embodiment 2 and 3 present the exemplary embodiments for the expansion method defined in Definition 2.

EMBODIMENT 1

Figure 2:
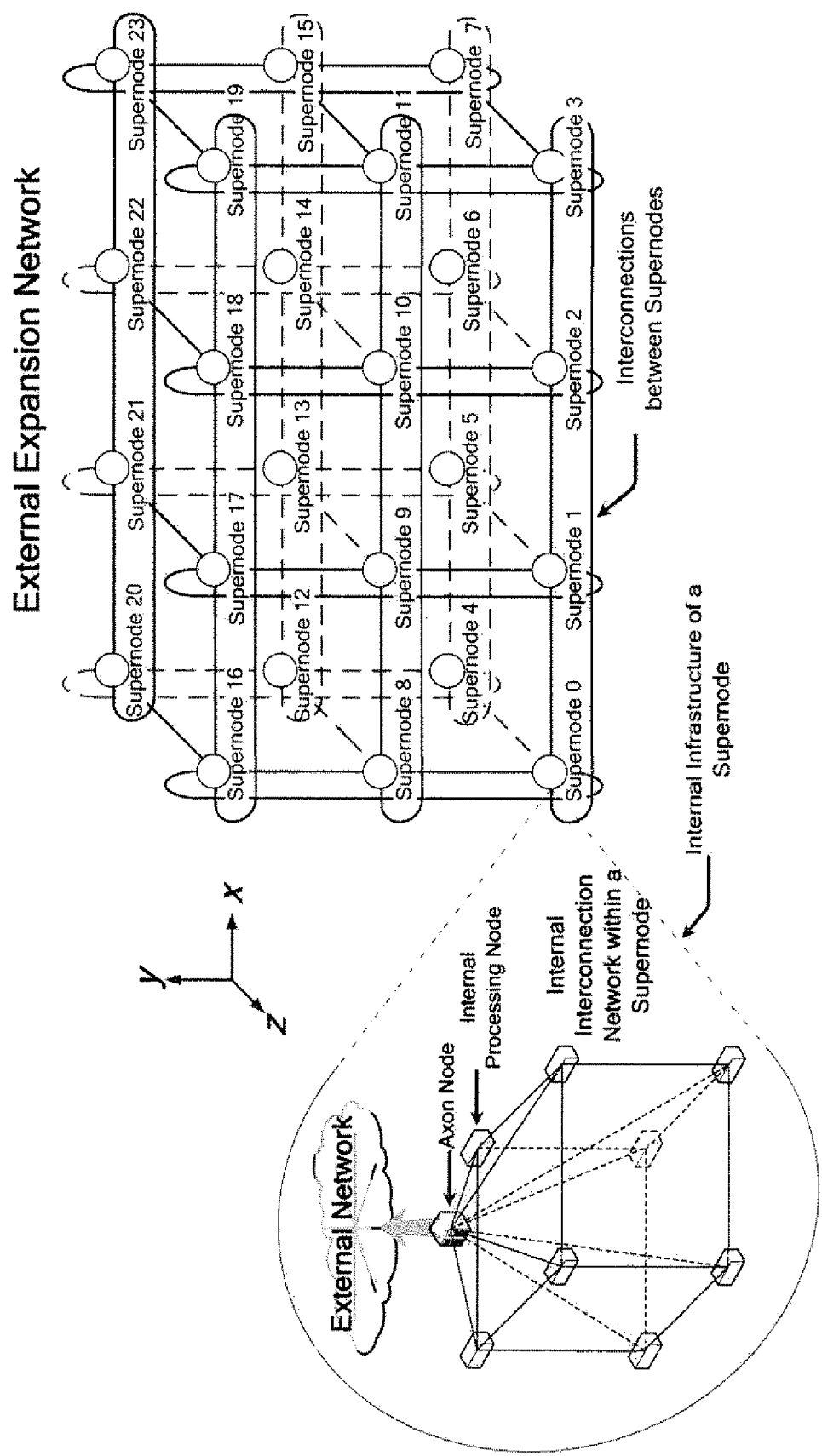
FIG. 2 is a simple illustration of a mixed interconnection system comprised of both internal and external networks, i.e., an exemplary embodiment of T(2×2×2)⊗T(4×3×2).

A mixed topology is comprised of both internal and external networks: Hypercube and 3-D torus networks $H(2 \times 2 \times 2) \otimes T(4 \times 3 \times 2)$ FIG. 2 is an exemplary embodiment of a mixed topology comprised of both internal and external networks i.e. $H(2 \times 2 \times 2) \otimes T(4 \times 3 \times 2)$. The internal interconnection network of each supernode is a hypercube topology $H(2 \times 2 \times 2)$ which includes eight processing nodes in $2 \times 2 \times 2$ and one Axon node and said Axon node connects to all of eight processing nodes where the external interconnection interfaces are provided. 24 said supernodes are interconnected by external interfaces as a three-dimensional $T(4 \times 3 \times 2)$ torus topology to form an external network, so that the whole system can integrate 192 processing nodes and 24 Axon nodes.

EMBODIMENT 2

Figure 3:
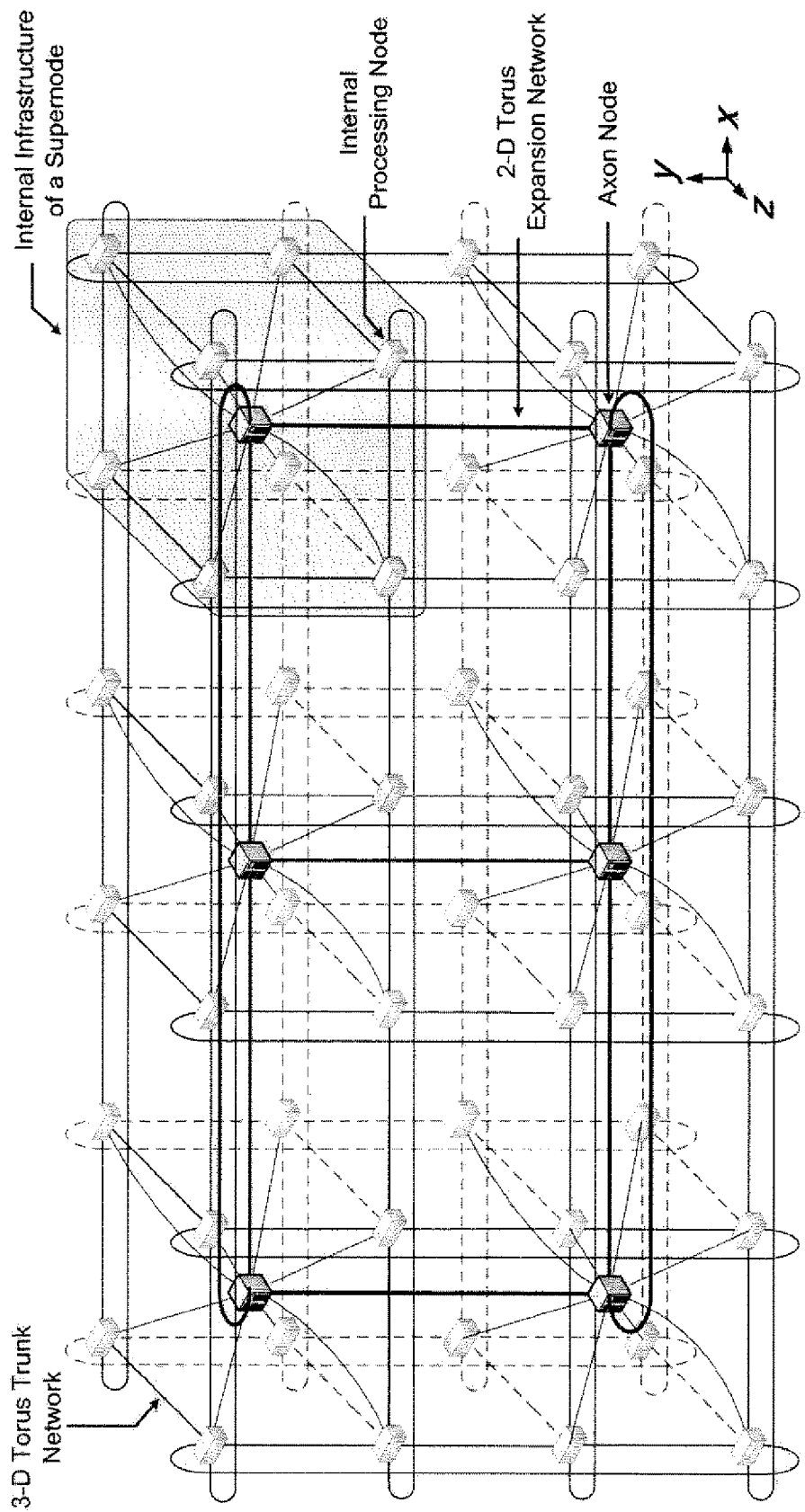
FIG. 3 is a simple illustration of a mixed interconnection system comprised of both trunk and expansion networks, i.e., an exemplary embodiment of T(3×2)⊗T(6×4×2).

A mixed topology is comprised of both trunk and expansion networks: $T(3 \times 2) \otimes T(6 \times 4 \times 2)$ FIG. 3 is an exemplary embodiment of a mixed topology comprised of both trunk and expansion networks i.e. $T(3 \times 2) \otimes T(6 \times 4 \times 2)$. The whole interconnection network comprises two independent networks, one is a three-dimensional network as a trunk network, the other is a two-dimensional torus network as an expansion network. Herein, the said 3-D trunk network is based on the $T(6 \times 4 \times 2)$ topology where all of processing nodes are interconnected and the said 2-D expansion network is based on the $T(3 \times 2)$ topology, in which all of Axon nodes are interconnection for especially communication accelerations, such as the long-range messaging and global operations. Each supernode comprises eight processing nodes and one Axon node which connects to all of the said processing nodes and provides the external interfaces among supernodes. Therefore, the whole system is able to integrate 48 internal processing nodes and 6 Axon nodes. Six said Axon nodes make up of a 2-D T(3×2) topology for the expansion network.

EMBODIMENT 3

A mixed topology is comprised of both trunk and expansion networks: T(6×2)⊗T(6×4×2)

Figure 4:
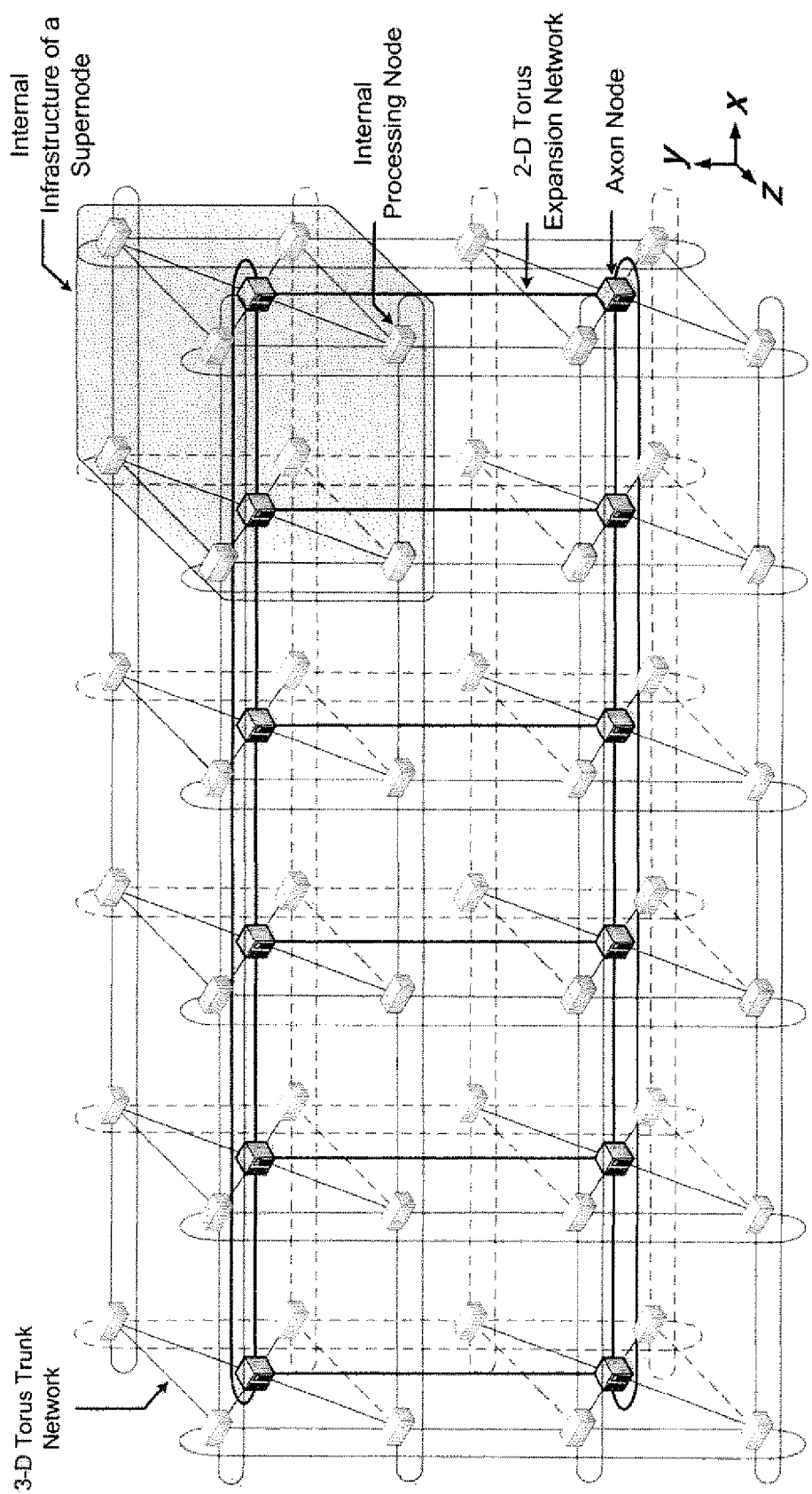
FIG. 4 is a simple illustration of a mixed interconnection system comprised of both trunk and expansion networks, i.e., an exemplary embodiment of T(6×2)⊗T(6×4×2).

FIG. 4 is an exemplary embodiment of a mixed topology comprised of both trunk and expansion networks i.e. T(6×2)⊗T(6×4×2). The whole interconnection network comprises two independent networks, one is a three-dimensional network as a trunk network, and the other is a two-dimensional torus network as an expansion network. Herein, the said 3-D trunk network is based on the T(6×4×2) topology where all of processing nodes are interconnected and the said 2-D expansion network is based on the T(6×2) topology, in which all of Axon nodes are interconnection for especially communication accelerations, such as the long-range messaging and global operations. Each supernode comprises eight processing nodes and two Axon nodes which connects to four internal processing nodes and provides the external interfaces for the supernodes. Therefore, the whole system is able to integrate 48 internal processing nodes and 12 Axon nodes. Six said Axon nodes make up of a 2-D T(6×2) topology for the expansion network.

Compared with the conventional multi-dimensional torus topology, the mixed torus, hypercube expansion methods help speedup the long-range communications, reduce the network diameter and increase the bisection width under the same dimensionality, by adding Axon nodes.

In addition, in the above-mentioned expansion schemes, the Axon node can be considered as the rank-one Axon node to allow the expansion network as a rank-one expansion network by connecting rank-one Axon nodes. Furthermore, according to the multi-rank expansion method as described in the patent "A self-consistent multi-rank tensor expansion scheme and multi-MPU parallel computing systems" (China patent application No. 200610030472.7), we can deduce a rank-two expansion network, i.e., by incorporating rank-two Axon nodes (a rank-two Axon node is an Axon node which connects a subgroup of the said rank-one Axon nodes and provides interconnection interfaces among rank-two Axon nodes) into the whole system and all of said rank-two Axon nodes are interconnected as a multi-dimensional interconnection network to form the said rank-two expansion network. Accordingly, we can construct rank-three and more expansion networks in the same manner, and the details are omitted herein.

As mentioned above, two types of mixed interconnection networks comprise of the mixed torus and hypercube multi-rank expansion method which is also an extension implementation and optimization to the self-consistent multi-rank tensor patent application No. 200610030472.7 titled "A self-consistent multi-rank tensor expansion scheme and multi-MPU parallel computing systems", based on torus and hypercube topologies.

The invention claimed is:

1. A method for expansion of a cube, integrated with supernodes, each supernode being provided with expansion interfaces into a larger-scale parallel processing system, said method comprising:
providing the cube as a mix of hypercube and torus topologies;
expanding the cube via multi-rank tensor expansion;
providing each of the supernodes, respectively, with a plurality of processing nodes and Axon nodes, wherein the Axon nodes connect a subgroup of or all of the plurality of processing nodes for a respective supernode;
interconnecting the plurality of processing nodes of the respective supernode as a multi-dimensional torus to form an internal interconnection network, wherein the internal interconnection network handles internal communication between the plurality of processing nodes;
interconnecting the Axon nodes to form an external interconnection network, wherein the external interconnection network handles external communication between the supernodes.

2. The method as claimed in claim 1, wherein the internal interconnection network within a supernode can be either a multi-dimensional torus topology or a multi-dimensional hypercube topology.

3. The method as claimed in claim 1, wherein the Axon nodes enable self-consistent expansion of the cube.

4. A method for expansion of a cube, integrated with supernodes, each supernode being provided with expansion interfaces into a large-scale parallel processing system, said method comprising:
providing the cube as a mix of hypercube and torus topologies;
expanding the cube via multi-rank tensor expansion;
interconnecting processing nodes in all of the supernodes as a multidimensional torus to form a trunk interconnection network, responsible for communication between the processing nodes;
adding one or more Axon nodes to each supernode, wherein the one or more Axon nodes connect a subgroup of processing nodes of the respective supernode and provides external interfaces; and
interconnecting all of the external interfaces as a multi-dimensional torus to form an external interconnection network, wherein the external interconnection handles external communication between the supernodes.

5. The method as claimed in claim 4, wherein all of the processing nodes are interconnected both within a supernode and between supernodes and all of the processing nodes are interconnected as a multi-dimensional torus topology to form a trunk interconnection network for communications between processing nodes.

6. The method as claimed in claim 5, wherein all of the processing nodes are interconnected as a K-dimensional $T(N_1 \times N_2 \times \ldots \times N_K)$ torus topology to form a trunk network, which integrates $$P = \prod_{s=1}^{K} N_s$$

processing nodes and all of the Axon nodes are interconnected as another K-dimensional $T(M_1 \times M_2 \times \ldots \times M_K)$ torus topology to form an expansion network, which integrates $$A = \prod_{s=1}^{L} M_s$$

Axon nodes each of which connects to P/A processing nodes.

7. The method as claimed in claim 6, wherein $M_S$ can be divided by $N_S$ and wherein S goes from 1 to K.

8. The method as claimed in claim 5, wherein all of the processing nodes are interconnected as a K-dimensional $T(N_1 \times N_2 \times \ldots \times N_K)$ torus topology to form a trunk network, which integrates $$A = \prod_{s=1}^{L} M_s$$

processing nodes and all of the Axon nodes are interconnected as a L-dimensional $T(M_1 \times M_2 \times \ldots \times M_L)$ torus topology to form an expansion network and wherein L<K.

9. The method as claimed in claim 4, wherein the one or more Axon nodes connect to a subgroup of the processing nodes in a supernode and provides the external interfaces for external expansion connections between the supernodes.

10. The method as claimed in claim 9, wherein all of the processing nodes are interconnected as a K-dimensional $T(N_1 \times N_2 \times \ldots \times N_K)$ torus topology to form a trunk network, which integrates $$P = \prod_{s=1}^{K} N_s$$

processing nodes and all of the Axon nodes are interconnected as another K-dimensional $T(M_1 \times M_2 \times \ldots \times M_K)$ torus topology to form an expansion network, which integrates $$A = \prod_{s=1}^{L} M_s$$

Axon noses each of which connects to P/A processing nodes.

11. The method as claimed in claim 10, wherein $M_S$ can be divided by $N_S$ and wherein S goes from 1 to K.

12. The method as claimed in claim 9, wherein all of the processing nodes are interconnected as a K-dimensional $T(N_1 \times N_2 \times \ldots \times N_K)$ torus topology to form a trunk network, which integrates $$P = \prod_{s=1}^{K} N_s$$

processing nodes and all of the Axon nodes are interconnected as a L-dimensional $T(M_1 \times M_2 \times \ldots \times M_L)$ torus topology to form an expansion network and wherein L<K.

13. The method as claimed in claim 4, wherein all of the processing nodes are interconnected as a K-dimensional $T(N_1 \times N_2 \times \ldots \times N_K)$ torus topology to form a trunk network, which integrates $$P = \prod_{s=1}^{K} N_s$$

processing nodes and all of the Axon nodes are interconnected as another K-dimensional $T(M_1 \times M_2 \times \ldots \times M_K)$ torus topology to form an expansion network, which integrates $$A = \prod_{s=1}^{L} M_s$$

Axon nodes each of which connects to P/A processing nodes.

14. The method as claimed in claim 13, wherein $M_S$ can be divided by $N_S$ and wherein S goes from 1 to K.

15. The method as claimed in claim 4, wherein all of the processing nodes are interconnected as a K-dimensional $T(N_1 \times N_2 \times \ldots \times N_K)$ torus topology to form a trunk network, which integrates $$P = \prod_{s=1}^{K} N_s$$

processing nodes and all of the Axon nodes are interconnected as a L-dimensional $T(M_1 \times M_2 \times \ldots \times M_L)$ torus topology to form an expansion network and wherein L<K.

16. The method as claimed in claim 4, wherein the one or more Axon nodes enable self-consistent expansion of the cube.

* * * * *

UNITED STATES PATENT AND TRADEMARK OFFICE
CERTIFICATE OF CORRECTION

PATENT NO. : 8,510,535 B2  
APPLICATION NO. : 12/141983  
DATED : August 13, 2013  
INVENTOR(S) : Yuefan Deng et al.

Page 1 of 1

It is certified that error appears in the above-identified patent and that said Letters Patent is hereby corrected as shown below:

In the Specification

Column 5, Lines 53-54 "tensor patent application" should be --tensor expansion scheme referring to the Chinese patent application--.

In the Claims

Column 7, Line 32 "Axon noses eacn" should be --Axon nodes each--.

Signed and Sealed this
First Day of July, 2014

Michelle K. Lee
*Deputy Director of the United States Patent and Trademark Office*